United States Patent [19]
Rowland

[11] Patent Number: 5,695,579
[45] Date of Patent: Dec. 9, 1997

[54] PROCESS AND APPARATUS FOR PRODUCING LAMINATED MATERIALS

[75] Inventor: Mark Jeremy Rowland, Oxfordshire, United Kingdom

[73] Assignee: Carnaudmetalbox plc, United Kingdom

[21] Appl. No.: 525,761

[22] PCT Filed: Mar. 17, 1994

[86] PCT No.: PCT/GB94/00536

§ 371 Date: Dec. 4, 1995

§ 102(e) Date: Dec. 4, 1995

[87] PCT Pub. No.: WO94/21456

PCT Pub. Date: Sep. 29, 1994

[30] Foreign Application Priority Data

Mar. 25, 1993 [GB] United Kingdom ............... 9306140

[51] Int. Cl.$^6$ ..................................................... B32B 31/00
[52] U.S. Cl. .................. 156/64; 156/272.2; 156/282; 156/308.2; 156/309.9; 156/324
[58] Field of Search .................. 156/308.2, 309.6, 156/309.9, 324, 498, 499, 555, 583.1, 64, 244.11, 244.24, 272.2, 282

[56] References Cited

U.S. PATENT DOCUMENTS

| | | | |
|---|---|---|---|
| 3,679,513 | 7/1972 | Addinall et al. | 156/308.8 |
| 5,059,460 | 10/1991 | Heyes et al. | 428/35.3 |
| 5,318,648 | 6/1994 | Heyes et al. | 156/244.24 |

FOREIGN PATENT DOCUMENTS

| | | |
|---|---|---|
| 0312304 | 10/1988 | European Pat. Off. . |
| 0312309 | 10/1988 | European Pat. Off. . |
| 0402004 | 5/1990 | European Pat. Off. . |
| 0485896 | 11/1991 | European Pat. Off. . |
| WO8903301 | 4/1989 | WIPO . |

*Primary Examiner*—James Sells
*Attorney, Agent, or Firm*—Diller, Ramik & Wight, PC

[57] ABSTRACT

A process and apparatus for producing laminated materials comprising a metal sheet laminated on one or both sides to a polymer film or films. The process comprises forming a laminate by a combination of heat and pressure followed by reheating. A heat zone is provided for heating and/or cooling the laminate after the reheat stage and prior to quenching so that the laminate enters the quenching stage at a substantially constant temperature, irrespective of line speed.

23 Claims, 3 Drawing Sheets

PROCESS AND APPARATUS FOR PRODUCING LAMINATED MATERIALS

This invention relates to a process and apparatus for producing laminated materials comprising a metal sheet laminated on one or both sides to a polymer film or films.

U.S. Pat. No. 3,679,513 describes a process for applying polyethylene films to a steel substrate during a predetermined heating cycle. The steel substrate is coated with chromium/chromium oxide and preheated so as to soften the polyethylene films which are applied to either side of the substrate between nip rolls. The resultant laminate is then reheated and temperature is maintained for from 5 to 240 seconds. Rapid cooling then takes place firstly by forced air to lower the temperature of the laminate to below the softening point of the polyethylene films, and finally by a water spray. In situations where fast line speeds are not of commercial importance, U.S. Pat. No. 3,679,513 suggests cooling in still air.

Both the rapid and the still air cooling methods of U.S. Pat. No. 3,679,513 lead to the polymeric film becoming at least partially crystalline. In particular, it has been found that forced air cooling below approximately 180° C. or spray quenching from a higher temperature leads to "spotting" of coating. These cooling methods cool only where the air or spray strikes the coating so that only local cooling occurs and a mottled, partially crystalline coating results. Crystallinity is particularly to be avoided when laminated materials are to be shaped into articles such as cans or can ends. In the case of a polypropylene film, "crystallinity" means $\alpha$-form (rather than smectic) crystallinity.

EP-B-0312309 seeks to overcome the problems of U.S. Pat. No. 5,679,513 and describes a process for laminating polypropylene film to a metal substrate. The resultant laminate is reheated to a temperature above the melting point of polypropylene and then uniformly and rapidly quenched by flooding the laminate with continuously cooled water which travels on the laminate to a collecting tank. Such rapid and uniform cooling seeks to prevent the polypropylene from having an x-form crystallinity and indeed provides a substantially smectic form of polypropylene. This form is less susceptible to deformations when shaped.

A problem which arises on start-up of lamination processes when line speed is slow is that recrystallisation or, in the case of polypropylene, the formation of an x-form crystallinity can take place as cooling occurs after leaving the reheat zone prior to quenching. This recrystallisation is also exhibited when cooled in still air as suggested in U.S. Pat. No. 3,679,513.

This invention therefore seeks to provide a process and apparatus in which partial crystallinity and development of discontinuities are avoided.

EP-A-0402004 describes a process for laminating aluminium and polyester in which the laminate is cooled by forced air after a reheat stage and prior to rapid quenching in water. In order to ensure the desired polyester structure in the laminate, the laminate should enter the water at a specific temperature T3. This temperature will, however, vary according to the line speed of the lamination process.

According to the present invention, there is provided a process for producing a polymer/metal laminate comprising the steps of:

(a) heating a metal strip in a first heater to a first temperature T1;

(b) feeding to a lamination nip both a strip of polymer film and the metal strip at said temperature T1, which is above the initial adhesion point of the polymer film, to cause intimate contact of the film with the metal strip;

(c) reheating the resultant laminate in second heater to a second temperature T2 to cause the film to interact with and bond to the metal strip;

(d) passing the laminate through a heat/cool zone to heat and/or cool the laminate across its width, according to the line speed, to an exit temperature T3;

(e) allowing bonding to develop between the film and the metal strip in said heat/cool zone; and (f) quenching the laminate rapidly and uniformly, the laminate entering this quenching stage at the temperature T3, irrespective of line speed. Preferably, bonding is allowed to develop for at least one second while heating and/or cooling the laminate across its width. The heating and/or cooling stage thus ensures that the laminate enters the quenching stage at substantially the same temperature $T_3$, irrespective of the line speed.

It was found that the temperature $T_3$ of the laminated material immediately before quenching was critical to ensuring that the polymer film, i.e. the coating, remained amorphous or, in the case of polypropylene, in substantially smectic form. Particular temperatures $T_3$ are required according to type of polymer film and preferably this temperature has a tolerance of ±15° C., irrespective of line speed.

Fine control of temperature $T_3$ is preferably achieved by heating the laminate at low line speeds and cooling the laminate at higher line speeds. Heating may be by arrays of infra-red, hot air or induction heaters and cooling may be by one or more fans which blow air through cooling means comprising nozzles, slits, or arrays of holes. Both heaters and cooling means preferably extend across at least the whole width of the laminate and may be provided on both sides of the laminate. Heaters and coolers on both sides of the laminate are preferred where polymer films are applied to both sides.

Advantageously, heating and/or cooling is by a column of heaters and cooling means, alternating along the column. These alternating columns have been found to be particularly advantageous in ensuring precise temperature conditions $T_3$ prior to quenching.

The heaters are preferably positioned between 20 mm and 100 mm from the laminate but may be moved towards or away from the laminate ouside this range as desired. A particular preferred position of the heaters from the laminate is 50 mm. The cooling nozzles etc are typically positioned closer to the laminate than the heaters, for example about 10 mm closer than the heaters.

In a particularly preferred embodiment,the process further comprises monitoring the temperature $T_3$ and adjusting power supplied to the heaters and/or fans so as to maintain temperature $T_3$ within a 30 degree acceptable range (ie. ±15° C.), irrespective of line speed.

In another embodiment, the process may also include recirculating warm air. Recirculating may also include further heating of air to be blown onto the laminate. Alternatively, cooling may comprise blowing cool, fresh air or warming fresh air and blowing this warmed air onto the laminate. Usually, an exhaust fan is provided which expels air which is not to be recycled.

According to another aspect of the present invention, there is provided an apparatus for producing a laminated material comprising a polymer film bonded to a metal substrate, said apparatus comprising:

a first heater for heating a metal strip to a first temperature T1;

means for feeding to a lamination nip both a strip of polymer film and the metal strip at said temperature T1, which is above the initial adhesion point of the polymer film, to cause intimate contact of the film with the metal strip;

a second heater for reheating the resultant laminate to a second temperature T2 to cause the film to interact with and bond to the metal strip;

a heat/cool zone comprising heaters and coolers disposed adjacent to the laminate;

sensing means for monitoring the temperature T3 across the width of the laminate as the laminate exits the heat/cool zone; and means for quenching the laminate rapidly and uniformly, the laminate entering the quenching means at the third temperature T3.

Preferably, the apparatus includes means for feeding the metal strip and two strips of polymer film to the lamination nip.

The heaters may be infra-red heaters or hot air or induction heaters, for example, and the coolers may be one or more fans in conjunction with nozzles, slits, or arrays holes across the width of the laminate. The heaters and nozzles are usually disposed alternately in a column, preferably with the nozzles nearer to the laminate than the heaters.

The sensing means preferably comprises at least one pyrometer, for monitoring the temperature $T_3$ and adjusting power supplied to the heaters and one or more fans. There may be an array of pyrometers, or other sensors, across the width of the laminate. The third temperature $T_3$ thus remains substantially constant irrespective of line speed.

In another preferred embodiment, the apparatus may include a recirculation damper. By adjusting the damper position, fresh or recirculated air may be blown through the nozzles, or a combination of both fresh and recirculated air.

A preferred embodiment of process and apparatus for producing laminated materials will now be described by way of example only, with reference to the drawings, in which.

Figure 1:
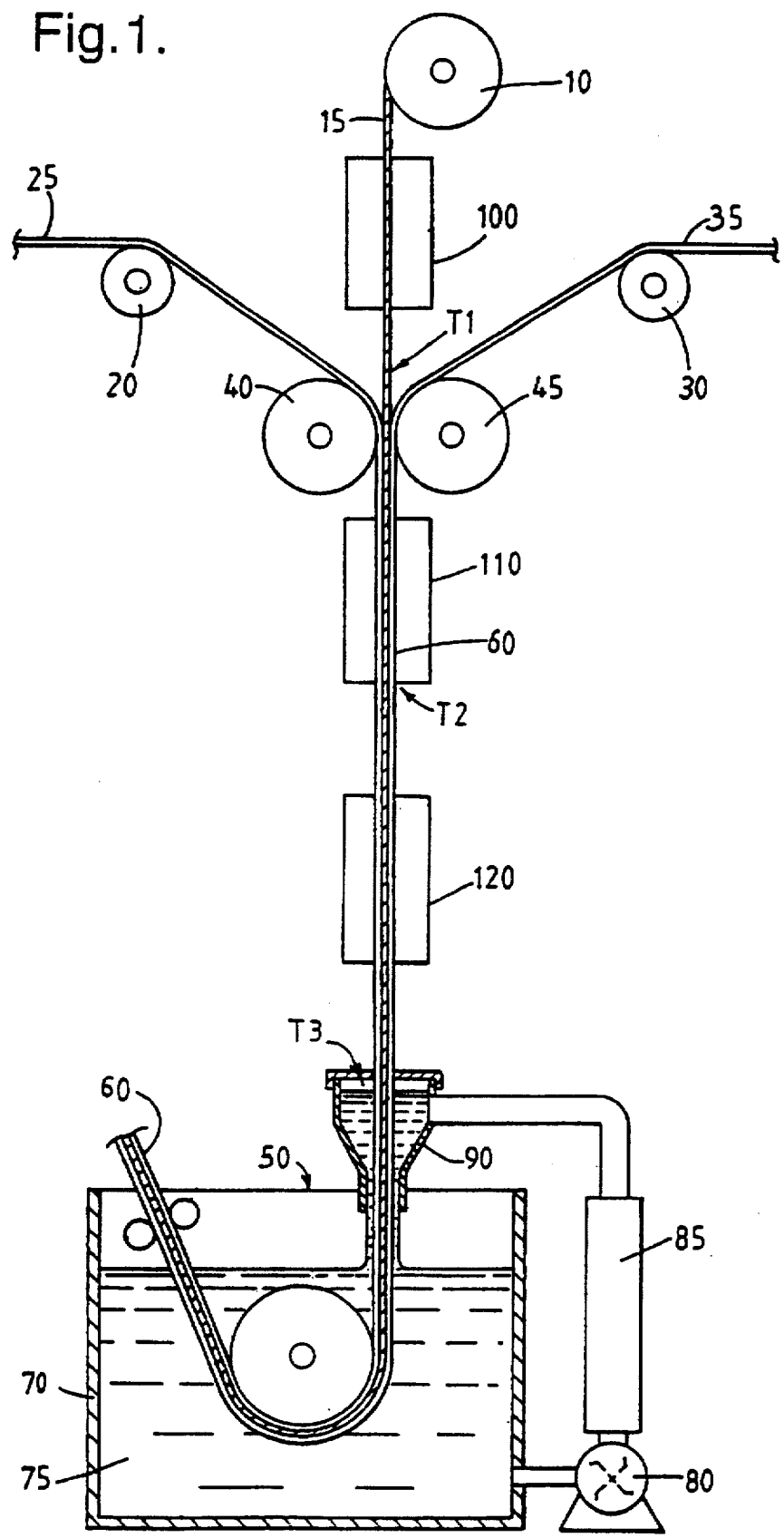
FIG. 1 is a diagrammatic sketch of an apparatus for laminating three strips of material.

In FIG. 1 it can be seen that the apparatus comprises a first roll 10 over which a metal strip 15 is passed and second and third rolls 20, 30, over each of which a polymeric film strip 25, 35 respectively, is passed. Pinch rolls 40, 45 bring the metal strip 15 and polymeric film strips 25, 35 together and quenching apparatus 50 immerses the resultant laminate 60 in a copious flood of cooling liquid in accordance with EP-B-0319309.

A preheater 100 is located between roll 10 and pinch rolls 49, 45 and serves to preheat the metal strip 15 to a temperature $T_1$ above the initial adhesion point of the polymeric films before laminating at the pinch rolls 40,45. A second heater 110 reheats the laminate 60 to a temperature $T_2$ higher than the preheat temperature $T_1$. Heat/cool zone 120 is located between heater 110 and the quenching apparatus 50 and serves to heat and/or cool the laminate 60, according to the line speed and laminate thickness, to ensure that the laminate 60 is at temperature $T_3$ immediately prior to quenching, irrespective of line speed. The length of zone 120 is such that the laminate 60 will take at least one second to pass through the zone at maximum line speed.

The quenching apparatus 50 comprises a reservoir 70 for containing a cooling liquid 75, a pump 80 to draw liquid from the reservoir 70, a heat exchanger 85 to cool liquid delivered by the pump and a trough 90 which receives cooled liquid from the heat exchanger 85. The laminate 60 passes through trough 90 and is entirely flooded edge to edge with cooled liquid. Alternatively, a preferred form of quenching apparatus comprises a pair of horizontal distibutor bars between which the laminate passes, generally vertically, and cooling liquid impinges at a small angle to the laminate from both sides, thus flooding the laminate with a continuously renewed supply of cooled liquid.

Figure 2:
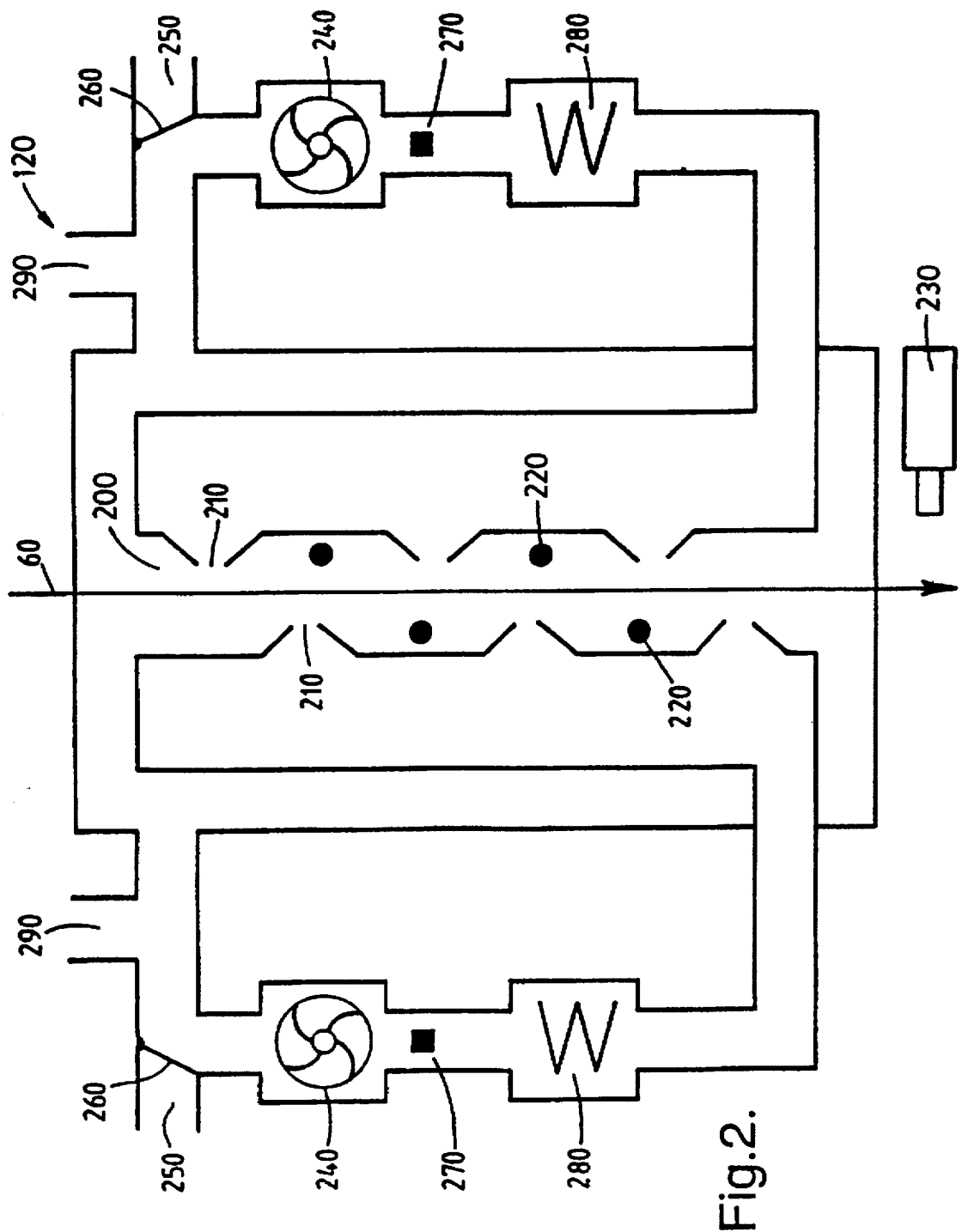
FIG. 2 is a longitudinal cross section of a heat zone of the apparatus of FIG. 1.

Heat/cool zone 120 is shown in more detail in FIG. 2 and comprises a zone 200 through which the laminate 60 passes prior to quenching, which consists of a column of nozzles or slits 210 and heaters 220 on each side of the laminate. The columns are offset from each other and each row alternates nozzle-heater- nozzle etc, with a nozzle at each column end, so that a nozzle on one column opposes a heater on the other column, except at the ends. A pyrometer 230 monitors the temperature $T_3$ of the laminate as it leaves the zone 200.

Power supplied to the heaters 220 and variable speed fans 243 is controlled by automatic adjustment of power supplied to each of these in response to the pyrometer output. The fans 240 are variable speed so that the amount of fresh air drawn into the zone through air inlets 250 can be adjusted.

In the embodiment of FIG. 2, dampers 260 are provided which enable air to be recirculated by fans 240. Recirculated air passes from each fan 240 past thermocouple 270, which adjusts both the damper position and preheat heater 280, and then past the preheat heater 280 to the nozzle 220. An exhaust 290 allows fumes and heat build-up to be removed from the zone.

Generally, the maximum width of the laminate 60 will be one meter with both heaters and nozzles extending beyond the edge of the laminate. The heaters will usually extend by at least 60 mm beyond each edge and the nozzles by at least 65 mm. It will be appreciated these sizes may vary according to the laminate width, availability of specific heaters and nozzles and width of metal/polymers available.

The distance of the laminate strip from the heaters is variable. Typically, this distance will be 50 mm and the nozzles are usually about 10 mm forward of the heaters. Variation in these distances is achieved by moving the heaters and/or nozzles on a frame towards or away from the strip. Limits on these distances are given both by the physical constraints of the zone assembly and by heat transfer requirements. A range of from 20 mm to 100 mm for the heater distance from the laminate would generally be acceptable.

Figure 3:
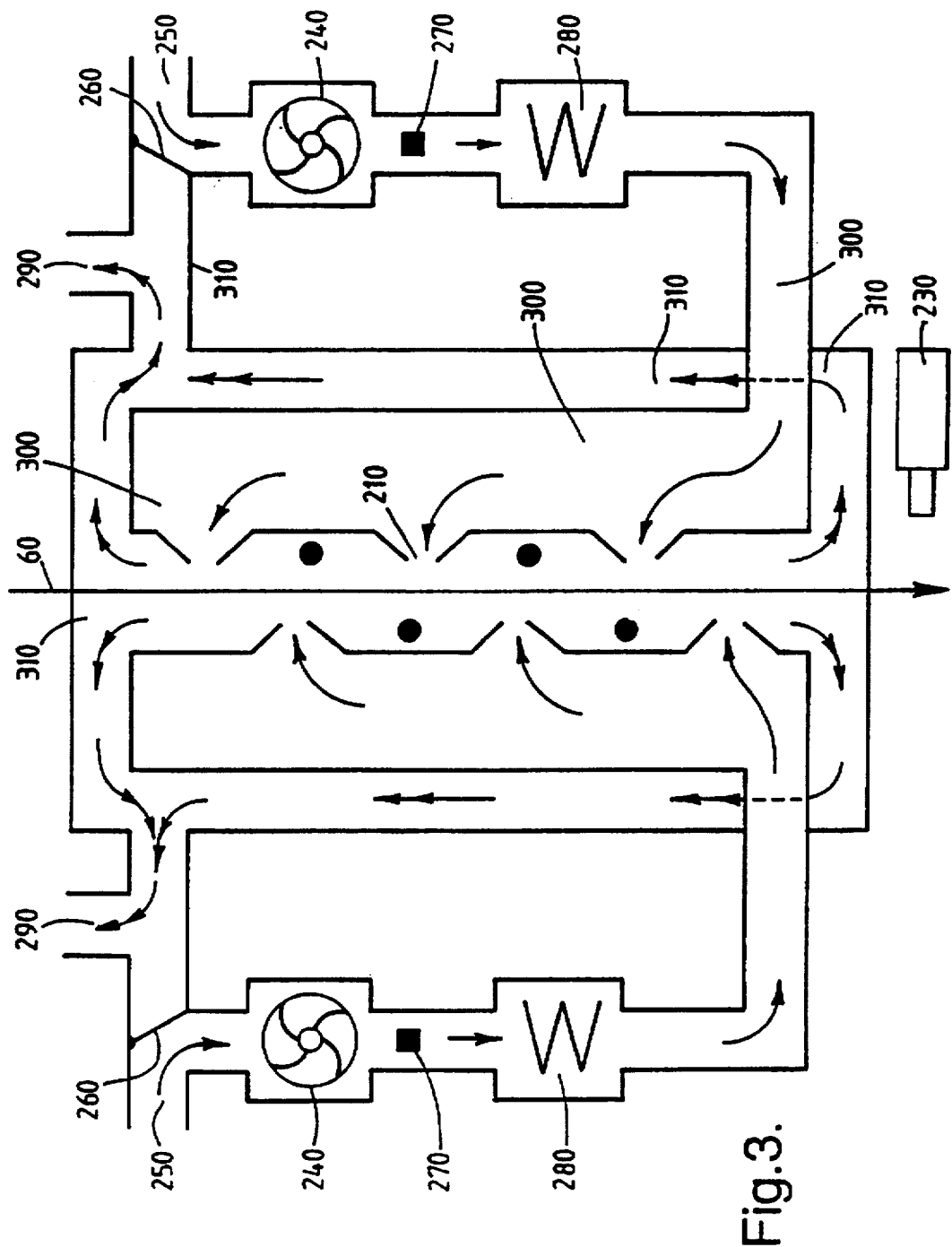
FIG. 3 is the cross section of FIG. 2 with arrows indicating the direction of air flow.

Flow of air through the heat zone is shown in FIG. 3. Fresh air is drawn in through air inlets 250 by circulation fans 240. Thermocouple 270 monitors the temperature of the air and dampers 260 and preheat heaters 280 are adjusted accordingly. The air then enters inner chamber 300 from which it passes through nozzles 210 onto the laminate 60 as it travels through the zone 120.

The laminate 60 travels through the center of an outer chamber 310 from which air can be removed to exhaust 290 by means of a variable speed exhaust fan (not shown). The air to be extracted can travel from either end of the columns of heaters and nozzles as shown by the double arrows in FIG. 3.

If the damper 260 is moved to the position shown in FIG. 2, warm air will be recirculated by fan 240 and its temperature monitored by thermocouple 270. Thermocouple 270 can be used to switch preheater 280 and/or to adjust the setting of damper 260.

The laminate travels from top to bottom as indicated in FIGS. 2 and 3 and its temperature $T_3$ is monitored by pyrometer 230 as it leaves the zone. The temperature $T_3$ which is required will vary according to the polymer films used but will be maintained substantially constant at both start up speed and as the line speed is increased to maximum.

The time taken for the laminate to pass through the heat/cool zone is generally at least 1 second at maximum line speed but a major requirement of the zone is that it can cope with a wide range of line speeds of 8 m/min to 80 m/min or more. 8 m/min is a typical start-up speed and at such a slow line speed it is imperative that the laminate be heated to avoid recrystallisation of the coating(s) or the return of a polypropylene film from smectic to α-form and to ensure that $T_3$ is controlled to ±15° C. of its required value.

As the line speed increases following start-up procedure, the amount of heat input required will decrease until it becomes necessary for power input to the heaters 220 to be reduced and/or the damper 260 to be adjusted to allow fresh cool air to be drawn by fan into heat zone 120 to cool the laminate.

The thickness of the laminate will also dictate the heat and/or cooling required to achieve desired temperature $T_3$ within a tolerance of +/−15° C.

It can thus be seen that a number of variables are involved in the heat/cool zone, particular settings being given in the examples which follow.

EXAMPLE 1.

A 0.2 mm gauge steel strip was preheated and 15 μm PET film applied in the nip rolls to one side of the strip and a 40 μm polypropylene film to the other side so that initial adhesion of the films to the strip occurred. The resultant laminate was reheated to a temperature $T_2$ of 255° C., this being the maximum temperature reached by the laminate during the lamination process. The laminate then entered the heat/cool zone and the heaters and/or fans were adjusted so that the laminate first contacted the quenching water at a temperature $T_3$ of 215° C. The length of the heat/cool zone was such that the time taken to travel from the exit of the reheat to the quenching stage was 2 seconds at maximum line speed.

At start-up speed of 8 m/min, full heating of about 30 to 40 kW was applied in the heat/cool zone, once the strip and film were moving. The fans were switched on at minimum so as to avoid the effects of inertia when cooling became required as the line speed increased. The exhaust fan was also on minimum to avoid over-cooling of the laminate by exhaust air at low line speed.

As the line speed was increased, $T_3$ was monitored and heating reduced automatically until little or no heating was required and the fan speed was then increased as necessary to provide cooling to ensure $T_3$ remained constant. The exhaust fan speed was also increased to expel exhaust gases more quickly.

Fine control of the heaters and fans ensured that temperature $T_3$ remained at about 215° C. for the laminate of this example for line speeds of from 8 m/min to 80 m/min.

EXAMPLE 2

A 0.17 mm gauge steel strip was preheated and 20 μm polypropylene film applied in the nip rolls to one side of the strip and a 40 μm polypropylene film to the other side so that initial adhesion of the films to the strip occurred. The resultant lamminate was reheated to a temperature $T_2$ of 230° C. In the heat/cool zone, the heaters and/or fans were adjusted automatically so that the laminate first contacted the quenching water at a temperature $T_3$ of 200° C.

For this example, full heating of 20 to 30 kW was applied at start-up speed of 8 m/min and reduced as the speed increased. Heating and/or cooling was adjusted automatically as in example 1 so as to ensure that $T_3$ remained at about 200° C. for line speeds of from 8 m/min to 80 m/min.

I claim:

1. A method of producing a polymer/metal laminate comprising the steps of:
   (a) heating a metal strip (15) to a first temperature (T1);
   (b) feeding a strip of polymer film (25 or 35) and the metal strip (15) at substantially the first temperature (T1), which is above the initial adhesion point of the polymer film, into a nip of a pair of lamination rolls (40, 45) to thereby cause intimate contact of the film with the metal strip thereby forming a laminate (60);
   (c) heating (110) the resultant laminate (60) exiting the lamination rolls (40, 45) to a second temperature (T2), which is higher than the first temperature (T1), to cause the film to interact with and bond to the metal strip;
   (d) passing the heated laminate through a heating and cooling zone (120) to selectively heat or cool the heated laminate across its width to a substantially constant bonding temperature (T3);
   (e) effecting bonding between the film and the metal strip in the heating and cooling zone (120) at the bonding temperature (T3);
   (f) monitoring the bonding temperature (T3) as the laminate exits the heating cooling zone (120); and
   (g) quenching (50) the laminate rapidly and uniformly downwardly from the bonding temperature (T3), irrespective of line speed, to a temperature substantially below the monitored bonding temperature (T3).

2. The method as defined in claim 1 in which bonding takes place in the heating and cooling zone (120) for at least one second while selectively heating or cooling the laminate across its width.

3. The method as defined in claim 1 or claim 2 in which step (d) is performed by selectively heating or cooling both sides of the laminate.

4. The method as defined in claim 1 in which heating is by arrays of infrared, hot air or induction heaters and cooling is by one or more fans which blow air through cooling means comprising nozzles, slits or arrays of holes.

5. The method as defined in claim 4 further comprising recirculating warmed air.

6. The method as defined in claim 4 further comprising adjusting the distance of the heaters and cooling means from the laminate.

7. The method as defined in claim 6 comprising adjusting the distance of the heaters to between 20 mm and 100 mm from the laminate.

8. The method as defined in claim 6 comprising positioning the cooling means closer to the laminate than the heaters.

9. The method as defined in claim 1 further comprising monitoring the temperature (T3), adjusting power supplied to the heaters and fans and adjusting power supplied to the heaters and fans and maintaining temperature (T3) within a 30° range (i.e., ±15° C.), irrespective of line speed.

10. The method as defined claim 2 in which heating is by arrays of infrared, hot air or induction heaters and cooling is by one or more fans which blow air through cooling means comprising nozzles, slits or arrays of holes.

11. The method as defined in claim 3 in which heating is by arrays of infrared, hot air or induction heaters and cooling is by one or more fans which blow air through cooling means comprising nozzles, slits or arrays of holes.

12. The method as defined in claim 5 further comprising adjusting the distance of the heaters and cooling means from the laminate.

13. The method as defined in claim 7 comprising positioning the cooling means closer to the laminate than the heaters.

14. The method as defined in claim 2 further comprising monitoring the temperature (T3), adjusting power supplied to the heaters and fans and adjusting power supplied to the heaters and fans and maintaining temperature (T3) within a 30° range (i.e., ±15° C.), irrespective of line speed.

15. The method as defined in claim 3 further comprising monitoring the temperature (T3), adjusting power supplied to the heaters and fans and adjusting power supplied to the heaters and fans and maintaining temperature (T3) within a 30° range (i.e., ±15° C.), irrespective of line speed.

16. The method as defined in claim 4 further comprising monitoring the temperature (T3), adjusting power supplied to the heaters and fans and adjusting power supplied to the heaters and fans and maintaining temperature (T3) within a 30° range (i.e., ±15° C.), irrespective of line speed.

17. The method as defined in claim 5 further comprising monitoring the temperature (T3), adjusting power supplied to the heaters and fans and adjusting power supplied to the heaters and fans and maintaining temperature (T3) within a 30° range (i.e., ±15° C.), irrespective of line speed.

18. The method as defined in claim 6 further comprising monitoring the temperature (T3), adjusting power supplied to the heaters and fans and adjusting power supplied to the heaters and fans and maintaining temperature (T3) within a 30° range (i.e., ±15° C.), irrespective of line speed.

19. The method as defined in claim 7 further comprising monitoring the temperature (T3), adjusting power supplied to the heaters and fans and adjusting power supplied to the heaters and fans and maintaining temperature (T3) within a 30° range (i.e., ±15° C.), irrespective of line speed.

20. The method as defined in claim 8 further comprising monitoring the temperature (T3), adjusting power supplied to the heaters and fans and adjusting power supplied to the heaters and fans and maintaining temperature (T3) within a 30° range (i.e., ±15° C.), irrespective of line speed.

21. An apparatus for producing a laminate defined by a polymer film bonded to a metal substrate comprising:
   (a) first heating means (100) for heating a metal strip (15) to a first temperature (T1);
   (b) means for feeding a strip of polymer film (25, 35) and the metal strip (15) at the first temperature (T1), which is above the initial adhesion point of the polymer film, into a nip of a pair of lamination rolls (40, 45) to thereby cause intimate contact of the film with the metal strip thereby forming a laminate (60);
   (c) second heating means (110) for heating the resultant laminate (60) to a second temperature (T2) to cause the film to interact with and bond to the metal strip;
   (d) a heating cooling zone (120) comprising selectively operative heaters and coolers disposed adjacent to the laminate;
   (e) sensing means for monitoring the temperature (T3) across the width of the laminate as the laminate exits the heating and cooling zone (120); and
   (f) means (50) for quenching the laminate rapidly and uniformly downwardly from the third temperature (T3), irrespective of line speed, to a temperature substantially below the monitored bonding temperature (T3).

22. The apparatus as defined in claim 21 in which the sensing means comprises at least one pyrometer for monitoring the temperature (T3) and adjusting power supplied to the heaters and coolers.

23. The apparatus as defined in claim 21 or claim 22 further comprising a recirculation damper (260).

* * * * *